United States Patent [19]

van Nuffel

[11] Patent Number: 4,782,127

[45] Date of Patent: Nov. 1, 1988

[54] STYRENIC POLYMER RESINS HAVING IMPROVED FLOW CHARACTERISTICS

[75] Inventor: Claude T. E. van Nuffel, Oostakker, Belgium

[73] Assignee: The Dow Chemical Company, Midland, Mich.

[21] Appl. No.: 882,314

[22] Filed: Jul. 7, 1986

[30] Foreign Application Priority Data

Jul. 8, 1985 [NL] Netherlands ............ 8501949

[51] Int. Cl.$^4$ ............................ C08F 220/12
[52] U.S. Cl. .................... 526/329.2; 526/349
[58] Field of Search ............ 526/324, 329.2

[56] References Cited

U.S. PATENT DOCUMENTS

| | | | |
|---|---|---|---|
| 2,984,651 | 5/1961 | Slocombe et al. | 526/324 |
| 4,229,549 | 10/1980 | Usami et al. | 525/308 |
| 4,330,641 | 5/1982 | Echte et al. | |
| 4,362,845 | 12/1982 | Kamata et al. | |
| 4,393,171 | 7/1983 | Bracke et al. | 525/309 |

FOREIGN PATENT DOCUMENTS

| | | | |
|---|---|---|---|
| 1560899 | 2/1969 | France | 526/324 |
| 762156 | 11/1956 | United Kingdom | 526/324 |
| 897839 | 5/1962 | United Kingdom | 260/78.5 |

*Primary Examiner*—Joseph L. Schofer
*Assistant Examiner*—N. Sarofin

[57] ABSTRACT

The flow properties of styrenic polymer resins derived from at least one monovinylidene aromatic compound and, optionally, other copolymerizable monomers, are improved by copolymerizing from 0.1 to 15 weight percent of an ester of acrylic acid, e.g., n-butylacrylate, with the monovinylidene aromatic compound and any other copolymerizable monomers employed in preparing the styrenic polymer resin.

1 Claim, No Drawings

STYRENIC POLYMER RESINS HAVING IMPROVED FLOW CHARACTERISTICS

The present invention relates to polymer resins, more particularly, to polymer resins derived from a monovinylidene aromatic compound and an ester of acrylic acid.

Thermoplastic materials derived from a monovinylidene aromatic compound such as styrene or a derivative of styrene and, optionally, one or more other comonomers such as acrylonitrile, are employed in a wide variety of commercial applications such as packaging, refrigerator linings, furniture, domestic appliances and toys. These thermoplastic materials are often referred to as "styrenic polymer resins".

The flow properties or characteristics of the styrenic polymer resins are an important property and are optimized for a particular end-use application. For example, it is desirable that the styrenic polymer resins ("styrene molding polymers") used in injection molding applications flow relatively easily, at the pressures employed, to completely fill a mold which can sometimes be of a complex or intricate shape. In general, unmodified styrenic polymer resins do not possess the desired flow characteristics for use in injection molding and other end-use applications.

To improve the flow properties of the styrenic polymer resin, it has become a common practice to add a flow promoter or plasticizer such as mineral oil to the resin. The plasticizer or flow promoter can be added before, during or after the preparation of the styrenic polymer resin. For example, in U.S. Pat. No. 3,100,195 combinations of mineral oil and saturated fatty acids are suggested to improve the flow properties of polystyrene as well as copolymers of styrene and, up to 15 weight percent optional comonomers such as styrene derivatives, esters of methacrylic and acrylic acid, acrylonitrile and butadiene.

Unfortunately, the effect of mineral oil or other similar plasticizer on the flow characteristics of the styrenic polymer resins is limited. Specifically, as the concentration of the mineral oil in the styrenic polymer resin increases, the clarity of the resulting resin is often reduced. For example, when more than 6 weight percent mineral oil is added to polystyrene, the resulting product becomes sufficiently hazy that it is of limited commercial value. Moreover, the presence of mineral oil or other plasticizer can often lead to a phenomenon known as "mold sweating". Specifically, the mineral oil or plasticizer diffuses to the interface between the styrenic polymer resin and the surface of the mold which often results in a non-uniform surface of the molded article.

It is also known that the flow properties of a styrenic polymer resin can be improved by preparing the styrenic polymer at a broader molecular weight distribution or by decreasing the molecular weight of the styrenic polymer. Unfortunately, as the molecular weight of the styrenic polymer becomes broader, the styrenic polymer resin often exhibits a lower strength. Moreover, methods for preparing a styrenic polymer at a broad molecular weight distribution are generally inefficient, i.e., the rate of conversion from monomer to polymer is generally lower. Alternatively, when the styrenic polymer is prepared at lower molecular weights, the resulting styrenic polymer resin is generally more brittle and less flexible, with a coincident decrease in strength.

In view of the stated deficiencies in the flow characteristics of the styrenic polymer resins, it remains highly desirable to provide a styrenic polymer resin having improved flow characteristics and a method for preparing such a styrenic polymer resin.

Accordingly, in one aspect, the present invention is a styrenic polymer resin derived from one or more monovinylidene aromatic compounds and, optionally, one or more other ethylenically unsaturated monomers, characterized in that the polymer comprises, in polymerized form, from 0.1 to 15 weight percent of an ester of acrylic acid.

In another aspect, the present invention is a method for preparing a styrenic polymer resin having improved flow properties which comprises polymerizing a monovinylidene aromatic compound and, optionally, other ethylenically unsaturated monomers characterized in that the monovinylidene aromatic compound and other ethylenically unsaturated monomers, if any, are copolymerized with from 0.1 to 15 weight percent, based on the total weight of the monomers, of an ester of acrylic acid.

Surprisingly, when a small amount, i.e., less than 15 weight percent, of an ester of acrylic acid is copolymerized with the monovinylidene aromatic compound and any other optionally employed comonomers to prepare the polymer matrix of a styrenic polymer resin, the resulting styrenic polymer resin exhibits improved flow characteristics. It is interesting that the esters of methacrylic acid, particularly those esters of methacrylic acid with an alcohol having from 1 to 5 carbon atoms, have not been found to significantly improve the flow characteristics of the styrenic polymer resin.

Moreover, copolymers of styrene or other monovinylidene aromatic compound with the acrylic acid ester as well as copolymers of styrene or other monovinylidene aromatic compound and acrylonitrile or other unsaturated nitrile with the acrylic acid ester are glass clear transparent polymers. In addition, due to the fact that the acrylic acid ester is present in copolymerized form in the styrenic polymer (i.e., is copolymerized with the monovinylidene aromatic compound and other comonomers), the problems of mold sweating which are associated with using relatively large concentrations of an unbound plasticizer such as mineral oil are reduced and/or eliminated.

The method of the present invention is suitably used to modify the flow characteristics of general purpose polystyrene (also referred to as crystal or GP polystyrene) and so-called SAN-type polymers (copolymers of styrene and acrylonitrile). The styrenic polymer resins of the present invention are useful in essentially any application in which the unmodified styrenic polymer resin can be employed. Due to their exceptional flow properties, the styrenic polymer resins of the present invention are particularly useful as styrene molding polymers in injection molding applications such as employed in the preparation of toys, appliances and electrical equipment and in the extrusion thermoformable applications.

The styrenic polymer resins of the present invention are derived from a monovinylidene aromatic compound and an ester of acrylic acid.

Representative monovinylidene aromatic compounds which can be employed herein include styrene, alkyl-substituted styrenes (e.g., alpha-methylstyrene and alpha-ethylstyrene) and ring-substituted styrenes (e.g., vinyl toluene, particularly para-vinyltoluene, ortho-ethylstyrene and 2,4-dimethylstyrene); ring-substituted halogenated styrenes such as chlorostyrene and 2,4-dichlorostyrene; styrenes substituted with both a halo and an alkyl group such as 2-chloro-4-methylstyrene and vinylanthracene. In general, the preferred monovinylidene aromatic compound(s) employed in preparing the styrenic polymer resin is styrene or a combination of styrene and alpha-methylstyrene (advantageously such combinations contain alpha-methylstyrene in amounts from 10 to 50, more advantageously from 15 to 40, weight percent of the total weight of the styrene and alpha-methylstyrene); with styrene being the most preferred monovinylidene aromatic compound.

The esters of acrylic acid suitably employed in the practice of the present invention are those esters which are capable of forming, when homopolymerized, a polymer having a glass transition temperature ($T_g$) of less than 0° C., preferably less than −20° C. wherein $T_g$ is measured by the ASTM test method designated D3418-75. The acrylic acid ester of the present invention is advantageously an ester of acrylic acid with an alcohol having from 1 to 12, preferably from 2 to 8 carbon atoms. Representative of such esters are ethylacrylate, iso-propylacrylate, n-propylacrylate, n-butylacrylate, sec-butylacrylate, octylacrylate and 2-ethylhexyl-acrylate. Of these esters, those having from 3 to 6, more preferably 4, carbon atoms are preferred. n-Butylacrylate is the most preferred acrylic acid ester.

In preparing the styrenic polymer resin of the present invention, the acrylic acid ester is employed in amount from 0.1 to 15 weight percent, said weight percents being based on the total weight of the styrenic polymer. Within said compositional limitation, the amount of the acrylic acid ester most advantageously employed is dependent on the specific monomeric components employed and their concentrations as well as whether the styrenic polymer resin contains a reinforcing agent, e.g., glass fibers. In general, the styrenic polymer comprises, in polymerized form, from 0.2 to 12, more preferably in an amount from 0.5 to 10, weight percent of acrylic acid ester, said weight percent being based on the total weight of the styrenic polymer. Lower concentrations tend to provide insufficient flow improvement and high concentrations tend to lower the heat distortion temperatures of the resin. Within these desired comonomer and concentration ranges the good flow and physical properties of the resins are found to provide improved cycle times when used in injection molding processes and reduce the time spent in cleaning molds.

In addition to the monovinylidene aromatic compound and acrylic acid ester, one or more other comonomers can be employed to form the styrenic polymer. Representative of such other comonomers include the unsaturated nitriles such as acrylonitrile, ethacrylonitrile, methacrylonitrile and mixtures thereof; the alpha,-beta-ethylenically unsaturated carboxylic acids such as acrylic and methacrylic acid; the esters of methacrylic acid such as ethyl methacrylate or methyl methacrylate and the vinyl esters such as vinyl acetate. Preferably the resins according to this invention consist essentially of the monovinylidene aromatic, acrylic acid ester and optional comonomers insofar as polymerized components are concerned (i.e., contain no rubber).

Of the various styrenic polymer resins comprising additional comonomers, polymer resins of particular interest in the practice of the present invention are modified SAN-type polymer resins comprising a copolymer of at least one monovinylidene aromatic compound and at least one unsaturated nitrile, modified by the acrylic acid ester. Preferred of the unsaturated nitriles is acrylonitrile. In preparing the styrenic polymer, the amount of the unsaturated nitrile(s) most advantageously employed will vary depending on the physical and chemical properties desired in the final styrenic polymer resin. In general, the styrenic polymer will advantageously be derived from 5 to 35, preferably from 15 to 25, weight percent of the unsaturated nitrile(s) wherein said weight percent is based on the total weight of the styrenic polymer.

In the practice of the present invention, the styrenic polymer resin having the improved flow characteristics is prepared by copolymerizing the monovinylidene aromatic compound(s) with the ester of the acrylic acid and any optionally employed other comonomers. In general, the polymerization techniques and conditions which can be employed in preparing styrenic polymer resins are advantageously employed in preparing the styrenic polymer resins of the present invention.

For example, in preparing general purpose polystyrene or SAN-type resins, mass or a combination of mass/suspension polymerization techniques are most commonly employed and are also suitably employed in the practice of the present invention wherein the acrylic acid ester is copolymerized with the monomers conventionally employed in preparing said resins. Illustrative mass polymerization techniques are described in U.S. Pat. No. 2,727,884, which is hereby incorporated by reference.

Using mass polymerization techniques, the styrenic polymer resin is preferably prepared in one or more substantially linear stratified flow or so-called plug flow type reactors, which may or may not comprise recirculation of a portion of the partially polymerized product or, alternatively, in a stirred tank reactor wherein the contents of the reactor are essentially uniform throughout. Depending on the specific monomeric components employed, an organic liquid reaction diluent such as aromatic hydrocarbon or inertly substituted aromatic hydrocarbon (e.g., ethylbenzene, benzene or toluene) and a free-radical initiator such as a peroxide initiator (e.g., azobisisobutyronitrile, 1,1-bis(tert-butylperoxy)-cyclohexane or dibenzoylperoxide) can be employed. The use of an organic liquid reaction diluent and/or a free-radical initiator and the amounts, if any, of both to be employed in the polymerization are well-known to the skilled artisan or easily determined using simple experimental techniques.

In general, the organic liquid reaction diluent is employed to control the viscosity of the polymerization mixture as well as to provide sufficient heat transfer thereof. If employed, it will generally comprise from 2 to 20 weight percent based on the total weight of the polymerization mixture (i.e., the copolymerizable monomers, and the organic liquid reaction diluent). The initiator can be employed to vary the product properties of the polymer as well as to modify the rate of polymerization. In general, if employed, the initiator is used in an amount from 50 to 5000, preferably from 100 to 2000, weight parts per million weight parts of the monomer employed. The mass polymerization mixture can further contain other additives such as an antioxidant (e.g., an alkylated phenol such as di-tert-butyl-p-cresol), a polymerization aid (e.g., a chain transfer agent such as an alkyl mercaptan) or a mold release agent (e.g., zinc stereate). In addition, a plasticizer or lubricant such as mineral oil (epoxidized soy bean oil, dioctyl adipate, dioctyl phthalate or butyl stearate) can be included in the polymerization mixture or can be post-added to the resulting product such as by melt blending. However, due to the flow promoting effect of the acrylic acid ester to the resulting stryenic polymer resin, the added plasticizer or lubricant is generally employed in lower than conventional amounts.

Temperatures at which polymerization can be conducted are dependent on the specific components employed but will generally vary from 75° to 225° C., preferably 90° to 190°. In the preparation of the styrenic polymer resin using the described mass polymerization techniques, the polymerization is continued to the desired degree of completion and the resulting product is then treated to remove any unreacted monomer such as by flashing of the monomer and other volatiles at an elevated temperature under vacuum.

The following experiments are set forth to illustrate the advantages of the present invention and should not be construed to limit its scope. In the experiments, all parts and percentages are by weight unless otherwise indicated.

In the experiments, melt flow rate was determined using test methods designated ASTM D-1238 and the Vicat temperature, which is an indication of the softening point of the polymer, was measured using the test methods described by ASTM D-1525-65T, Rate B. The tensile properties were measured using test method designated ASTM-T-638 on samples which were compression molded at a melt temperature of 180° C. The tensile yield is expressed in Newtons per square millimeter ($N/mm^2$) and the elongation is the elongation at break expressed as a percentage of the original length. The molecular weight of the styrenic polymer was measured using gel permeation chromatography and the test method designated ASTM D-363, without correction between the copolymer and polystyrene standards and the solution viscosity was measured using the test method designated ASTM D-445.

Experiment 1

To determine the effect of an ester of an acrylic acid when copolymerized with a monovinylidene aromatic compound on the flow properties of the resulting resin, 97.5 weight parts of styrene and 2.5 weight parts of n-butylacrylate were mixed and added to an ampoule. All oxygen is then removed from the ampoule and replaced by nitrogen. The oxygen-free ampoule is then sealed and placed in a isothermal oil bath heated to a temperature of 140° C. for 72 hours. Subsequently, the ampoule is removed from the oil bath and placed in an air circulating oven at 220° C. for a period of 6 hours. The styrene and n-butylacrylate are essentially completely polymerized using these polymerization conditions.

Experiments 2-6

In a manner identical to that of Experiment 1, a series of copolymers of styrene and n-butylacrylate were prepared using the amounts of styrene and n-butylacrylate recorded in Table I.

Comparative Experiment A

For purposes of comparison, a homopolymer of styrene is prepared using the techniques of Experiment 1.

To determine the effect of the n-butylacrylate on the resulting styrenic polymer resin, the melt flow rate, solution visocity and Vicat softening temperature of each of the resulting products was measured. The results of these measurements are set forth in the accompanying Table I.

TABLE I

| Experiment No. | 1 | 2 | 3 | 4 | 5 | 6 | Comparative Experiment A |
|---|---|---|---|---|---|---|---|
| Polymer Composition Wgt % | | | | | | | |
| Styrene | 97.5 | 95 | 92.5 | 90 | 87.5 | 85 | 100 |
| n-Butylacrylate | 2.5 | 5 | 7.5 | 10 | 12.5 | 15 | 0 |
| Polymer Properties | | | | | | | |
| Melt Flow Rate, g/10 min. | 5.4 | 6.8 | 8.7 | 11.0 | 14.1 | 18.1 | 4.2 |
| Vicat Softening Temperature, °C. | 93 | 89 | 84 | 79 | 75 | 70 | 96 |
| Solution Viscosity, mPas | 24.3 | 24 | 25.2 | 25 | 24.2 | 23.8 | 23.6 |

As evidenced by the data set fort in Table I, the inclusion of n-butylacrylate into the styrenic polymer resin increases the melt flow rate of the resulting resin which indicates the improvement of flow characteristics of the resin. Increasing the amount of the n-butylacrylates increases the effect of this monomer on the flow properties of the resulting resin. Mineral oil (2 weight percent based on the total weight of the styrenic polymer resin) was added to the styrenic polymers containing 2.5 and 5 weight percent n-butylacrylate. The addition of this amount of mineral oil further increases the melt flow rates of these resins. Specifically, the melt flow rate of a styrenic polymer resin comprising 95.5 percent styrene, 2 percent mineral oil and 2.5 percent n-butylacrylate exhibited a melt flow rate of 7.8 g/10 min whereas the styrenic resin comprising 93 percent styrene, 2% mineral oil and 5 percent n-butylacrylate exhibited a melt flow rate of 10 g/10 min. However, the Vicat softening temperature was further decreased by the addition of the mineral oil. Specifically, the Vicat softening temperature of the styrenic resin comprising 2.5 percent n-butylacrylate and 2 percent mineral oil was 86° C. whereas the Vicat softening temperature of a styrenic resin comprising 5 percent n-butylacrylate and 2 percent mineral oil was 82° C. Further increases in the melt flow rate with coincident decreases in the Vicat softening temperature were evidenced when 4 percent mineral oil was added to the resins.

Experiment 7

A styrenic polymer resin was prepared using several plug-flow type reactors essentially as described in U.S. Pat. No. 2,727,884. The reactors were connected in series and each reactor was equipped with a variable speed agitator and heating and cooling means. To the top of the first reactor was continuously added a solution comprising 86.8 percent styrene, 7 percent ethylbenzene, 4 percent mineral oil, 2.2 percent n-butylacrylate and 0.02 parts of a free-radical initiator. The polymerization was conducted at temperatures between 107° C. (initial polymerization temperature) to 140° C. (final polymerization temperature) until 80 percent of the monomers are converted to polymer. Subsequently, the resulting mixture was discharged from the base of the last reactor and passed through a devolatilizer wherein the unreacted monomer and ethylbenzene are removed from the polymerization mixture.

Comparative Experiment B

A styrenic polymer resin is prepared using identical techniques to that employed in Experiment 7 except that the feed stream contains no n-butylacrylate and comprises 89 percent styrene.

The melt flow rate Vicat softening temperature, molecular weight and tensile properties of the styrenic polymer resins prepared in Experiment 7 and Comparative Experiment B were measured. The results of these measurements as well as the composition of the resulting styrenic resin are set forth in Table II.

TABLE II

| Polymer Composition, Wgt. % | Experiment 7 | Comparative Experiment B |
|---|---|---|
| Styrene | 93.3 | 95.7 |
| n-Butyl Acrylate | 2.5 | — |
| Mineral Oil | 4.2 | 4.3 |
| Polymer Resin Properties | | |
| Melt Flow Rate g/10 min | 16 | 10.6 |
| Vicat Softening Temperature, °C. | 88 | 92 |
| Molecular weight | 250 000 | 240 000 |
| Tensile yield, N/mm$^2$ | 32.4 | 32.4 |

As evidenced by the data set forth in Table II, copolymerizing the styrene with n-butylacrylate to prepare the styrenic polymer resin significantly increases the melt flow rate of the resulting polymer which provides improved flow characteristics to the styrenic polymer resin.

Experiment 8

A copolymer of styrene, acrylonitrile and n-butylacrylate was continuously prepared by introducing a feed stream comprising 64 percent styrene, 24 percent acrylonitrile, 4.5 percent n-butylacrylate and 7.5 percent ethylbenzene to a coil reactor. The polymerization was conducted at a temperature of 150° C. with the average residence time being 45 minutes. The polymerization mixture withdrawn from the coil reactor was passed to a devolatilizer where the residual monomer was removed from the mixture and recycled to the polymerization process. The resulting copolymer product comprised 71.9 percent styrene, 25.1 percent acrylonitrile and 3 percent n-butylacrylate. The number average molecular weight of this copolymer was 88 000 and the weight average molecular weight was 212,000. The melt flow rate of the polymer was 4.0 grams per 10 minutes and the polymer had a Vicat softening temperature of 103° C.

Comparative Experiment C

A SAN polymer was prepared using identical techniques to that of Experiment 8 except that the feed comprised 68.5 percent styrene and 24 percent acrylonitrile and 7.5 percent ethylbenzene (no n-butylacrylate being employed). The resulting polymer exhibited a number average molecular weight of 88 000 and a weight average molecular weight of 203 000. The melt flow rate of the resulting polymer was 2.9 g/10 min and the Vicat softening temperature was 106° C.

As evidenced by a comparison of the polymers prepared in Experiment 8 and Comparative Experiment C, the polymer containing the n-butylacrylate exhibited a higher melt flow rate than a comparative polymer prepared without the n-butylacrylate even though the molecular weight of the n-butylacrylate containing polymer was higher than that of the polymer which did not contain n-butylacrylate.

What is claimed is:

1. A thermoplastic polymeric molding composition the polymeric content thereof consisting in polymerized form from 99.9 to 85 weight percent styrene or a mixture of styrene and acrylonitrile and from 0.1 to 15 weight percent of n-butyl acrylate.

* * * * *